June 14, 1960  J. A. HENDERSON ET AL  2,941,083
SYSTEM FOR SEPARATING AND EXTRACTING
RELATED RECORDED INFORMATION
Filed Jan. 10, 1958  2 Sheets-Sheet 1
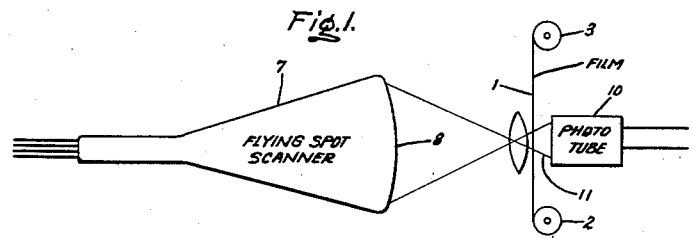
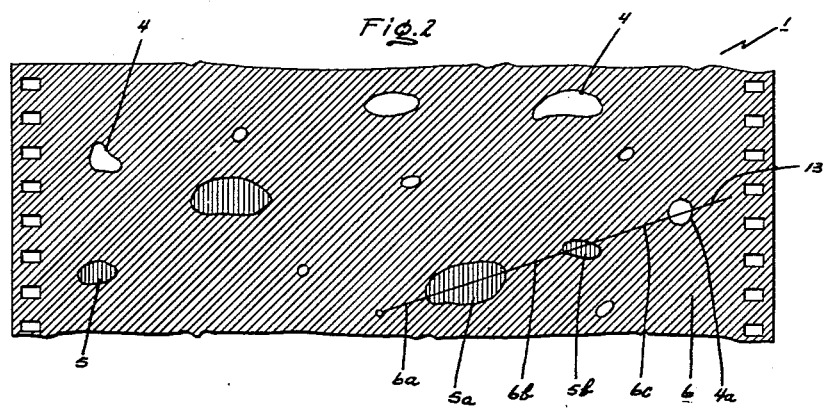
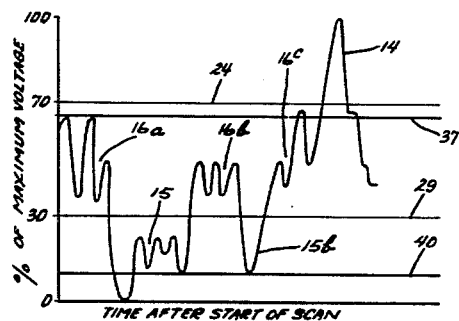
Inventors:
J. Alvin Henderson,
Delbert J. Johnson,
Edward W. Koenig,
by Lust & Irish
Their Attorneys.

June 14, 1960    J A. HENDERSON ET AL    2,941,083
SYSTEM FOR SEPARATING AND EXTRACTING
RELATED RECORDED INFORMATION
Filed Jan. 10, 1958                    2 Sheets-Sheet 2
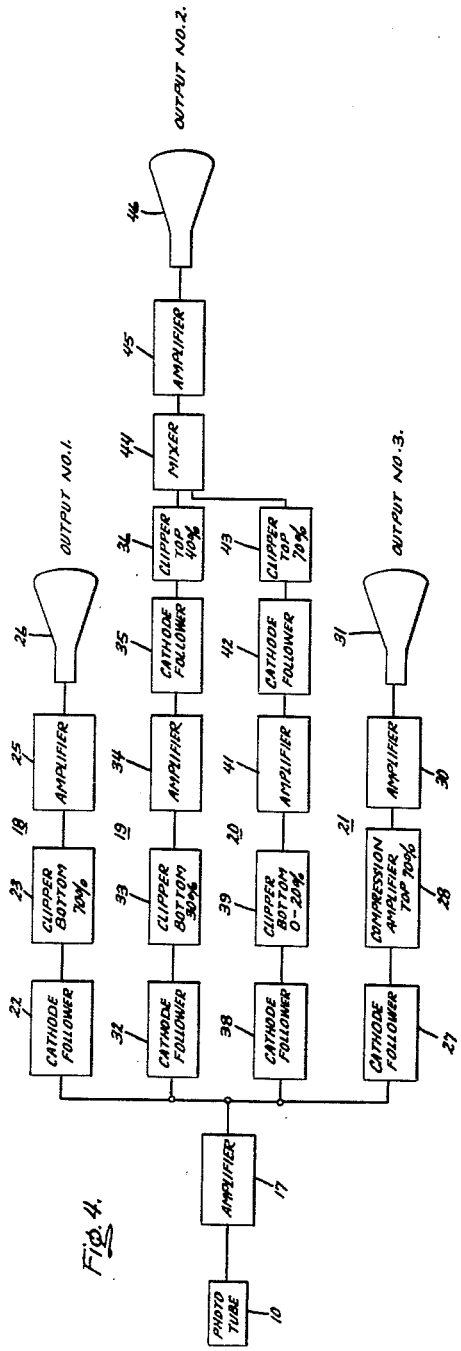
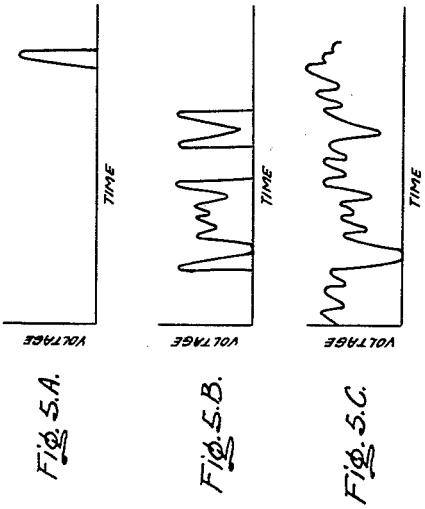
Inventors:
J. Alvin Henderson,
Delbet J. Johnson,
Edward W. Koenig,
by Gust & Dish
Their Attorneys.

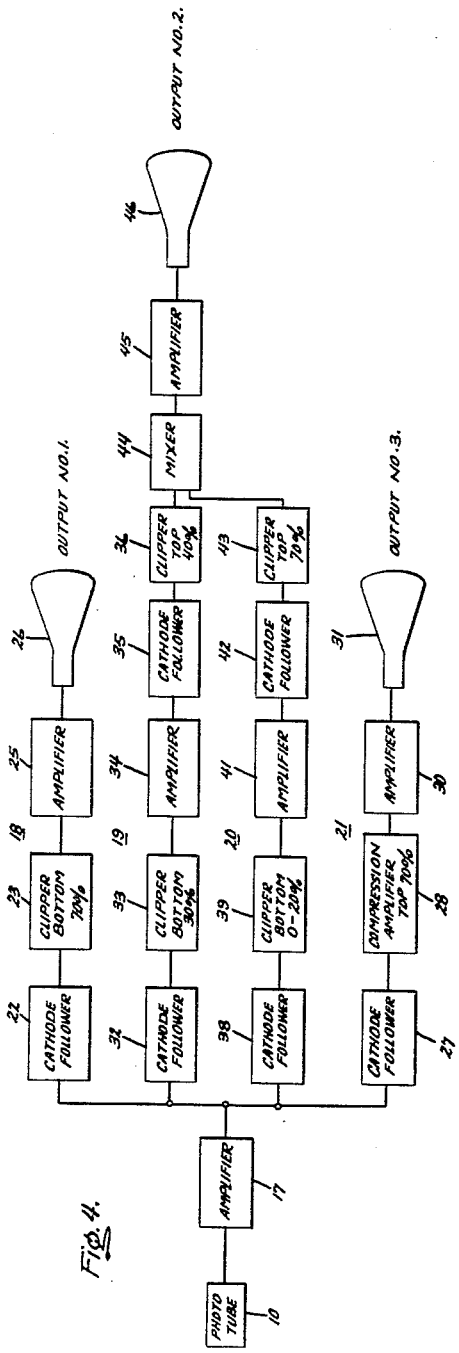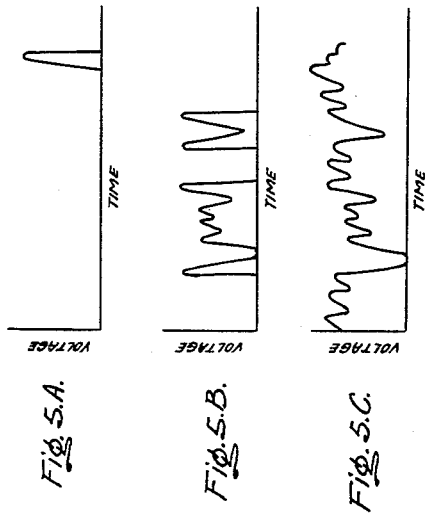

United States Patent Office 2,941,083
Patented June 14, 1960

2,941,083

SYSTEM FOR SEPARATING AND EXTRACTING RELATED RECORDED INFORMATION

J Alvin Henderson, Delbert L. Johnson, and Edward W. Koenig, Fort Wayne, Ind., assignors to International Telephone and Telegraph Corporation Filed Jan. 10, 1958, Ser. No. 708,082

9 Claims. (Cl. 250—206)

This invention relates to a system for separating and extracting at least two different spatially related types of information recorded on a single media.

There are instances in which it is desirable to record, as on a film, several different types of information which have a space relationship as well as a type relationship. For example, it is desirable to provide a radar signal simulator in which three different types of radar information from targets whose positions are fixed relative to each other may be recorded on a single film, such film being utilized to provide three separate output signals each presenting one of the types of radar information with the three output signals having the same space relationship as they had in the original film. This may be accomplished by assigning certain film density or light transmission levels to each set of information to be stored and extracted; a plurality of such light transmission levels can be provided on a continuous strip of film thereby providing continuous recorded target information, as would be provided for example by actual radar sets in an airplane. With this arrangement, the highest transmission level may be assigned to targets appearing in small numbers and which are small in area, for example, moving targets on the ground, and the lowest light transmission level may be assigned to proportionately larger targets, for example, fixed objects on the ground such as roads and buildings. A well-focused spot of unmodulated light may be used to scan the film thus providing a modulated beam of light in response to the light transmission levels on the film. This modulated beam of light is viewed by a photosensitive device which thus provides a signal, the voltage levels of which correspond to the light transmission levels of the film. This modulated signal voltage may then be clipped at appropriate levels and then recombined to present the three separate types of radar information to three separate display scopes; for example, one set of information may be from the highest light transmission range alone thus displaying only the moving targets on the ground, another set of information may be from the lowest light transmission range with all other light transmission ranges eliminated thus providing terrain altitude information, and the third set of information may consist of a combination of the information contained in the lowest light transmission range and some information from higher light transmission ranges, thus providing a radar map.

It is therefore an object of our invention to provide a system for separating and extracting at least two different spatially related types of information recorded on a single media.

Another object of our invention is to provide an improved radar simulator system for separately presenting several different sets of radar information which have been recorded on a single film.

The above mentioned and other features and objects of this invention and the manner of attaining them will become more apparent and the invention itself will be best understood by reference to the following description of an embodiment of the invention taken in conjunction with the accompanying drawings, wherein:

Fig. 1 is a schematic illustration showing the apparatus for scanning the film to recover the recorded information;

Fig. 2 is a view showing a segment of a typical film usable with the apparatus of Fig. 1 with three different types of information recorded thereon;

Fig. 3 shows a voltage waveform of the modulated signal provided by one scanning line on the film segment of Fig. 2;

Fig. 4 is a schematic block diagram of a circuit for separating and extracting the three types of information recorded on the film of Fig. 2; and Figs. 5a, 5b and 5c, showing the voltage wave forms of the three output signals provided by the circuit of Fig. 4.

Referring now to Figs. 1, 2 and 3, the film 1 in accordance with our invention, may be elongated and arranged on suitable rolls 2 and 3. By properly exposing or modifying film 1, three separate sets of information are recorded thereon. Thus, on film 1 appear a plurality of first areas 4 having the lowest density, i.e., highest light transmission characteristic; areas 4 may either be relatively clear film or even holes punched through the film 1. These areas 4 provide information representing small moving targets on the ground, as will be hereinafter more fully described. Also recorded on film 1 are a plurality of areas 5 having a high density, i.e., low light transmission, it being understood that the areas 5 represent a range of light transmission rather than a single light transmission level. The remaining area of the film, designated as 6, has an intermediate light transmission range, it again being understood that the area 6 has a range of light transmission characteristics rather than a single light transmission level; for example, the areas 4 may have a light transmission from 70% to 100%, the areas 5 may have a light transmission from 0% to 30%, and the remaining area 6 may have a light transmission from 30% to 70%.

In order to extract the information recorded on film strip 1, the film 1 is scanned by a well focused beam of light, for example, by a suitable flying spot cathode ray tube scanner 7 which sweeps or scans a high intensity wellfocused beam of light across the face 8 thereof with a suitable objective lens 9 focusing the light spot onto the film 1. A suitable photo-sensitive device, such as phototube 10, is disposed on the side of the film remote from the scanner 7 so that it recives the beam of light 11 which passes through the film 1 and is thus modulated in response to the light transmission levels of the areas scanned by the unmodulated beam 12 provided by the scanner 7; phototube 10 thus provides a modulated output signal responsive to the relative light transmission ranges of the areas on film 1 scanned by the beam of light 12 from the flying spot scanner 7.

The flying spot scaner 7 may provide a P.P.I. or polar scan of the film 1 in any suitable manner, as is well known in the art, and a single scanning line 13 thus provided by the scanner 7 as shown on Fig. 2 with Fig. 3 showing the resulting modulated signal provided by the phototube 10 in response to the single scan 13; it will be observed that the area 4a scanned by the scanning line 13 provides a peak 14 in the modulated output signal with the low light transmission in areas 5a and 5b providing low voltage areas 15a and 15b and the intermediate areas 6a, 6b and 6c providing corresponding intermediate voltage levels 16a, 16b and 16c in the modulated output signal.

Referring now to Fig. 4, there is shown in schematic form a circuit which will provide three output signals from the modulated output signal of the phototube 10, the first output signal containing information responsive only to the highest light transmission areas 4, the third output signal providing information responsive to the lowest light transmission areas 5 and some information from higher light transmission ranges, and the second output signal providing information responsive only to the lowest light transmission range of the areas 5 to the exclusion of any higher light transmission ranges. Here, the output of phototube 10 is fed to the input circuit of any suitable amplifier 17, the output circuit of the amplifier 17 being connected respectively to four circuits 18, 19, 20 and 21. Circuit 18 connected to the output circuit of amplifier 17 preferably includes a cathode follower circuit 19, which in turn is connected to a clipping circuit 20 arranged to clip off the bottom 70% of the modulated signal provided by the phototube 10 and thus to pass only the upper portion of the voltage output of the phototube 10 above 70% or level 24 as shown in Fig. 3. The output of the clipping circuit 23 is in turn fed to the input circuit of a suitable amplifier 25 which in turn is fed to a suitable display scope 26. It is thus seen that the voltage band passed by the circuit 18 and the resulting signal displayed on the scope 26 is responsive only to the highest light transmission areas 4 of film 1, for example, peak 14 of Fig. 3, and thus the corresponding signal displayed on scope 26 will appear as in Fig. 5a.

Circuit 21 preferably includes a suitable cathode follower circuit 27 connected to the output circuit of amplifier 17 which in turn feeds a suitable non-linear or compression amplifier 28. Compression amplifier 28 is arranged linearly to pass all of the lower voltage band of the modulated signal provided by phototube 10 below the 30% level, i.e., level 29 in Fig. 3, and to compress the voltage band above level 29. The output circuit of compression amplifier 28 is fed to a suitable amplifier 30 which in turn feeds a suitable display scope 31. It is thus seen that the signal passed by the circuit 21 is responsive to the information contained in the lowest light transmission range of areas 5 and to some of the information contained in the higher light transmission ranges 6 and 4, thus providing a displayed signal on a scope 31 as shown in Fig. 5c.

In order to provide an output signal presenting only the information contained in the lowest light transmission range of areas 5 to the exclusion of information contained in any higher light transmission range, circuits 19 and 20 are provided. Circuit 19 preferably includes a suitable cathode follower 32 connected to the output circuit of amplifier 17 and feeding a clipping circuit 33 arranged to clip off the bottom 30% of the modulated signal provided by phototube 10, i.e., that portion of the signal below the level 29. The output of the clipping circuit 33 is fed to suitable amplifier 34 which in turn feeds another suitable cathode follower 35. Cathode follower 35 feeds another suitable clipping circuit 36 which is arranged to clip off the top 40% of the modulated signal provided by phototube 10, i.e., all that above the voltage level 37. The output of circuit 19 is thus a voltage band between levels 29 and 24 of the modulated signal. Circuit 20 preferably includes cathode follower 38 connected to the output circuit of amplifier 17, and in turn feeds clipping circuit 39 which selectively clips off between 0 and 20% of the bottom portion of the modulated signal provided by phototube 10, i.e., for example, below level 40. Clipper 39 in turn feeds suitable amplifier 41 which in turn feeds a suitable cathode follower 42. Cathode follower 42 is fed to a suitable clipping circuit 43 which clips off the top 70% of the modulated signal provided by phototube 10, i.e., everything above level 29. It will now be seen that the output of the circuit 20 provides a part at least of the lowest voltage band of the modulated signal provided by phototube 10 and thus is responsive to the lowest light transmission range of film 1. It will however be observed that the signal provided by circuit 20 includes some of the information contained in the higher light transmission ranges. It will further be observed that the signal provided by circuit 19 is responsive to higher light transmission ranges above the light transmission range of the areas 5. Thus, in order to eliminate the information contained in such higher light transmission ranges from the information contained in the lowest light transmission range, the signal provided by circuit 19 is subtractively mixed with the signal provided by signal 20 by means of a suitable mixer 44 which in turn feeds a suitable amplifier 45 which supplies the signal for display scope 46. It is thus seen that the information displayed on the scope 46 will be only that contained in the lowest light transmission areas 5 to the exclusion of the information contained in all higher light transmission areas, as shown in Fig. 5b.

It will now be seen that the circuit of Fig. 4 provides a first output signal presenting only the information contained in the highest light transmission range, i.e., information concerning small moving targets, output 2 provides information responsive only to the lowest light transmission range to the exclusion of any higher light transmission ranges, i.e., terrain altitude information, and output 3 provides information responsive to the lowest light transmission range with some information from higher light transmission ranges, i.e., a radar map showing fixed ground objects such as buildings and roads.

It will be readily apparent that the particular clipping levels described above in connection with Fig. 4 are for illustrative purposes only and that other specific levels may be employed to provide the desired output signals. It will also be seen that while a subtractive mixer 44 is shown for subtractively combining the outputs of circuits 19 and 20, the outputs of one of the circuits 19 or 20 may be inverted and additively combined.

It will be readily seen that the several types of information may be recorded on the film 1 by assigning a particular color to each information type and that the pick-up device may then be arranged to be color sensitive and capable of separating the several types of information by extracting the light of the particular light spectrum assigned to each set. It will further be seen that the information may be recorded on opaque means, such as paper, as by printing, rather than on film, with the light beam from the flying spot scanner to be reflected onto suitable photosensitive means rather than passed through a film as shown.

It will now be readily apparent that we have provided a simple system for separating and extracting several different spatially related types of information recorded on a single media, such as a film, and more particularly that we have provided an improved radar simulator which will extract and present three different types of radar information which have been recorded on a single continuous film strip.

While we have described above the principles of our invention in connection with specific apparatus, it is to be clearly understood that this description is made only by way of example and not as a limitation to the scope of our invention.

What is claimed is:

1. A system for separating and extracting at least two different spatially related types of information recorded on a single media comprising: first means having said information recorded thereon in the form of spaced areas having different light response ranges; means for scanning said first means with an unmodulated light beam thereby providing a light beam modulated in response to the light response ranges of said areas; photosensitive means arranged to receive said modulated light beam to provide a modulated signal responsive thereto; means coupled to said photosensitive means for passing a predetermined voltage band of said modulated signal to provide a first output signal responsive to all information contained in corresponding light response ranges; and means for providing a second output signal responsive only to information contained in a predetermined light response range to the exclusion of information contained in all other light response range comprising means coupled to said photo-sensitive means for passing a predetermined voltage band of said modulated signal to provide a first intermediate signal responsive to a corresponding light response range, means coupled to said photosensitive means for passing a predetermined voltage band of said modulated signal different from said last-named voltage band to provide a second intermediate signal responsive to another corresponding light response range, and means for combining said intermediate signals.

2. A system for separating and extracting at least two different spatially related types of information recorded on a single media comprising: first means having said information recorded thereon in the form of spaced areas having different light response ranges; means for scanning said first means with an unmodulated light beam thereby providing a light beam modulated in response to the light response ranges of said areas; photosensitive means arranged to receive said modulated light beam to provide a modulated signal responsive thereto; means coupled to said photosensitive means for passing a predetermined voltage band of said modulated signal to provide a first output signal responsive to all information contained in corresponding light response ranges; and means for providing a second output signal responsive only to information contained in a predetermined light response range to the exclusion of information contained in all other light response ranges comprising means coupled to said photosensitive means for passing a predetermined voltage band of said modulated signal to provide a first intermediate signal responsive to a corresponding light response range, means coupled to said photosensitive means for passing another predetermined voltage band of said modulated signal adjacent said last-named voltage band to provide a second intermediate signal responsive to a light response range adjacent said last-named light response range, and means for subtractively combining said intermediate signals.

3. A system for separating and extracting at least two different spatially related types of information recorded on a single media comprising: first means having said information recorded thereon in the form of spaced areas having different light response ranges; means for scanning said first means with an unmodulated light beam thereby providing a light beam modulated in response to the light response ranges of said areas; photosensitive means arranged to receive said modulated light beam to provide a modulated signal responsive thereto; means coupled to said photosensitive means for passing an upper voltage band of said modulated signal above a predetermined upper voltage level to provide a first output signal responsive only to the information contained in a higher light response range; and means for providing a second output signal responsive only to information contained in a lower light response range to the exclusion of information contained in all higher light response ranges comprising means coupled to said photosensitive means for passing a predetermined voltage band of said modulated signal below a predetermined lower voltage level to provide a first intermediate signal responsive to information contained in said lower light response range and some at least of the information contained in higher light response ranges, means coupled to said photosensitive means for passing a predetermined voltage band of said modulated signal above said predetermined lower voltage level to provide a second intermediate signal responsive to information contained in higher light response ranges, and means for subtractively combining said intermediate signals.

4. A system for separating and extracting at least two different spatially related types of information recorded on a single media comprising: first means having said information recorded thereon in the form of spaced areas having different light response ranges; means for scanning said first means with an unmodulated light beam thereby providing a light beam modulated in response to the light response ranges of said areas; photosensitive means arranged to receive said modulated light beam to provide a modulated signal responsive thereto; means coupled to said photosensitive means for passing all of the voltage band of said modulated signal below a predetermined lower voltage level to provide a first output signal responsive to the information contained in a lower light response range and some at least of the information contained in higher light response ranges; and means for providing a second output signal responsive only to information contained in said lower light response range to the exclusion of information contained in all higher light response ranges comprising means coupled to said photosensitive means for passing a predetermined voltage band of said modulated signal below said lower voltage level to provide a first intermediate signal responsive to information contained in said lower light response range and some at least of the information contained in higher light response ranges, means coupled to said photosensitive means for passing a predetermined voltage band of said modulated signal above said last-named predetermined lower voltage level to provide a second intermediate signal responsive to information contained in higher light response ranges, and means for subtractively combining said intermediate signals.

5. A system for separating and extracting at least two different spatially related types of information recorded on a single media comprising: first means having said information recorded thereon in the form of spaced areas having different light response ranges; means for scanning said first means with an unmodulated light beam thereby providing a light beam modulated in response to the light response ranges of said areas; photosensitive means arranged to receive said modulated light beam to provide a modulated signal responsive thereto; first clipping means coupled to said photosensitive means for clipping said modulated signal at a first predetermined upper voltage level and for passing all of the upper voltage band of said modulated signal above said upper voltage level to provide a first output signal responsive only to the information contained in the highest light response range; and means for providing a second output signal responsive only to information contained in the lowest light response range to the exclusion of information contained in all higher light response ranges comprising second clipping means coupled to said photosensitive means for clipping said modulated signal at second and third predetermined lower levels with said third level being below said second level and for passing the voltage band of said modulated signal between said lower levels to provide a first intermediate signal responsive to information contained in the lowest light response range and at least some of the information contained in higher light response ranges, third clipping means coupled to said photosensitive means for clipping said modulated signal at said second predetermined voltage level and at a fourth predetermined voltage level intermediate said second and first voltage levels and for passing the voltage band of said modulated signal between said second and fourth voltage levels to provide a second intermediate signal responsive to information contained in higher light response ranges, and means for subtractively combining said intermediate signals coupled to said second and third clipping means.

6. A system for separating and extracting at least two different spatially related types of information recorded on a single media comprising: first means having said information recorded thereon in the form of spaced areas having different light response ranges; means for scanning said first means with an unmodulated light beam thereby providing a light beam modulated in response to the light response ranges of said areas; photosensitive means arranged to receive said modulated light beam to provide a modulated signal responsive thereto; compression amplifier means coupled to said photosensitive means arranged to pass all of the lower voltage band of said modulated signal below a first predetermined lower voltage level and to compress the voltage band of said modulated signal above said first voltage level to provide a first output signal responsive to the information contained in the lowest light responsive range and some of the information contained in higher light response ranges; and means for providing a second output signal responsive only to information contained in said lowest light response range to the exclusion of information contained in higher light response ranges comprising first clipping means coupled to said photosensitive means for clipping said modulated signal at said first voltage level and at another lower voltage level and for passing the voltage band of said modulated signal between said first and other voltage levels to provide a first intermediate signal responsive to information contained in the lowest light response range and at least some of the information contained in higher light response ranges, second clipping means coupled to said photosensitive means for clipping said modulated signal at said first voltage level and at a third voltage level higher than said first voltage level and for passing the voltage band of said modulated signal between said first and third voltage levels to provide a second intermediate signal responsive to information contained in higher light response ranges, and means for subtractively combining said intermediate signals coupled to said first and second clipping means.

7. A system for separating and extracting at least three different spatially related types of information recorded on a single media comprising: first means having said information recorded thereon in the form of spaced areas having different light response ranges; means for scanning said first means with an unmodulated light beam thereby providing a light beam modulated in response to the light response ranges of said areas; photosensitive means arranged to receive said modulated light beam to provide a modulated signal responsive thereto; means coupled to said photosensitive means for passing all of the upper voltage band of said modulated signal above a first predetermined upper voltage level to provide a first output signal responsive only to the information contained in the highest light response range; means coupled to said photosensitive means for passing all of the lower voltage band of said modulated signal below a second predetermined lower voltage level to provide a second output signal responsive to the information contained in the lowest light response range and some at least of the information contained in higher light response ranges; and means for providing a third output signal responsive only to information contained in the lowest light response range to the exclusion of information contained in all higher light response ranges comprising means coupled to said photosensitive means for passing a predetermined voltage band of said modulated signal below said second voltage level to provide a first intermediate signal responsive to information contained in said lowest light response range and some at least of the information contained in higher light response ranges, means coupled to said photosensitive means for passing a predetermined band of said modulated signal above said second voltage level and below said first voltage level to provide a second intermediate signal responsive to information contained in higher light response ranges, and means for subtractively combining said intermediate signals.

8. A system for separating and extracting at least three different spatially related types of information recorded on a single media comprising: first means having said information recorded thereon in the form of spaced areas having different light response ranges; means for scanning said first means with an unmodulated light beam thereby providing a light beam modulated in response to the light response ranges of said areas; photosensitive means arranged to receive said modulated light beam to provide a modulated signal responsive thereto; first clipping means coupled to said photosensitive means for clipping said modulated signal at a first predetermined upper voltage level and for passing all of the upper voltage band of said modulated signal above said first voltage level to provide a first output signal responsive only to the information contained in the highest light response range; compression amplifier means coupled to said photosensitive means arranged to pass all of the lowest voltage band of said modulated signal below a second predetermined lower voltage level and to compress the voltage band of said modulated signal above said second voltage level to provide a second output signal responsive to the information contained in the lowest light response range and some of the information contained in higher light response ranges; and means for providing a third output signal responsive only to information contained in said lowest light response range to the exclusion of information contained in higher light response ranges comprising second clipping means coupled to said photosensitive means for clipping said modulated signal at said second voltage level and at a third voltage level lower than said second voltage level and for passing the voltage band of said modulated signal between said second and third voltage levels to provide a first intermediate signal responsive to information contained in said lowest light response range and some at least of the information contained in higher light response ranges, third clipping means coupled to said photosensitive means for clipping said modulated signal at said second voltage level and at a fourth voltage level below said first voltage level and for passing the voltage band of said modulated signal between said second and fourth voltage levels to provide a second intermediate signal responsive to information contained in higher light response ranges, and mixing means coupled to said second and third clipping means for subtractively combining said intermediate signals.

9. A radar simulator system for separating and extracting three types of recorded radar information comprising: a film having said information recorded thereon in the form of spaced areas having three different light transmission ranges; a flying spot scanner for scanning said film with an unmodulated beam of light whereby the light beam passing through said film is modulated responsive to the light transmission ranges of said area; photosensitive means arranged to receive said modulated light beam to provide a modulated signal responsive thereto; a first circuit connected to said photosensitive means and including first clipping means arranged to clip off all of the bottom portion of said modulated signal below a first predetermined upper voltage level and to pass all of the highest voltage band of said modulated signal above said first voltage level thereby to provide a first output signal responsive to the information contained in the highest light transmission range of said film; a second circuit connected to said photosensitive means and including a compression amplifier arranged to pass all of the lowest voltage band of said modulated signal below a second predetermined voltage level and to compress the voltage band of said modulated signal above said second voltage level thereby to provide a second output signal responsive to information contained in the lowest light transmission range of said film and some of the information contained in higher light transmission ranges; a third circuit connected to said photosensitive means and including second clipping means arranged to clip off a part at least of the bottom portion of said modulated signal below a third voltage level lower than said second voltage level, and third clipping means arranged to clip all of the top portion of said modulated signal above said second predetermined voltage level whereby said third circuit passes at least a part of said lowest voltage band of said modulated signal to provide a first intermediate signal responsive to the information contained in said lowest light transmission range and some of the information contained in higher light transmission ranges; a fourth circuit connected to said photosensitive means and including fourth clipping means arranged to clip off all of the bottom portion of said modulated signal below said second voltage level, and fifth clipping means arranged to clip off all of the top portion of said modulated signal above a fourth voltage level intermediate said second and first voltage levels whereby said fourth circuit passes a voltage band of said modulated signal to provide a second intermediate signal responsive to the information contained in light transmission ranges above said lowest range; and a mixer connected to said third and fourth circuits for subtractively combining said first and second intermediate signals to provide a third output signal responsive only to the information contained in said lowest light transmission range to the exclusion of information contained in all higher light transmission ranges.

References Cited in the file of this patent

UNITED STATES PATENTS 2,824,486    Lawrence et al. _____ Feb. 25, 1958